United States Patent
Kotha et al.

(10) Patent No.: US 10,445,122 B2
(45) Date of Patent: Oct. 15, 2019

(54) EFFECTIVE AND EFFICIENT VIRTUAL MACHINE TEMPLATE MANAGEMENT FOR CLOUD ENVIRONMENTS

(71) Applicant: VMWARE, INC., Palo Alto, CA (US)

(72) Inventors: Venu Gopala Rao Kotha, Bangalore (IN); Shashidhar Narayana Krishnamurthy, Bangalore (IN); Anirudh Agarwal, Bangalore (IN); Sureshbabu Koyadan Chathoth, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 42 days.

(21) Appl. No.: 15/083,293

(22) Filed: Mar. 29, 2016

(65) Prior Publication Data

US 2017/0228246 A1    Aug. 10, 2017

(30) Foreign Application Priority Data

Feb. 8, 2016    (IN) .............................. 201641004376

(51) Int. Cl.
G06F 9/455    (2018.01)

(52) U.S. Cl.
CPC ................. G06F 9/45558 (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 8,631,403 | B2* | 1/2014 | Soundararajan | G06F 9/5077 |
| | | | | 718/1 |
| 8,886,865 | B1* | 11/2014 | Huang | G06F 3/0665 |
| | | | | 711/6 |
| 8,977,735 | B2* | 3/2015 | Salinas | G06F 17/30557 |
| | | | | 370/217 |
| 9,304,793 | B2* | 4/2016 | Kannan | G06F 9/45558 |
| 9,323,565 | B2* | 4/2016 | Li | G06F 9/45558 |
| 9,619,268 | B2* | 4/2017 | Beveridge | G06F 9/45558 |

(Continued)

OTHER PUBLICATIONS

AlBelooshi et al. "Inspection and Deconfliction of Published Virtual Machine Templates' Remnant Data for Improved Assurance in Public Clouds", 2015 IEEE, 4 pages.*

(Continued)

*Primary Examiner* — Van H Nguyen
(74) *Attorney, Agent, or Firm* — Loza & Loza, LLP

(57) ABSTRACT

Techniques are provided for reducing the amount of data that to be transferred in a hybrid cloud system in order to spawn a VM at a private cloud computing system from a template library stored in a public cloud computing system. Instead of storing full virtual machine templates, template libraries at the public cloud computing system are "differential" libraries. Differential templates in these differential libraries only include data that is different as compared with either a base template or another differential template. Assuming a private cloud system already stores a base image, the private cloud system may spawn a VM based on a particular template simply by downloading the appropriate differential templates. This technique reduces the total amount of data that needs to be downloaded from the public cloud system in order to spawn a particular VM.

17 Claims, 5 Drawing Sheets

(56) References Cited

U.S. PATENT DOCUMENTS

| | | | | |
|---|---|---|---|---|
| 9,626,212 | B2* | 4/2017 | Beveridge | G06F 9/45558 |
| 9,792,131 | B1* | 10/2017 | Uchronski | G06F 9/455 |
| 2007/0106993 | A1* | 5/2007 | Largman | G06F 9/5077 |
| | | | | 718/104 |
| 2012/0151477 | A1* | 6/2012 | Sinha | G06F 9/45558 |
| | | | | 718/1 |
| 2015/0142878 | A1* | 5/2015 | Hebert | H04L 67/10 |
| | | | | 709/203 |
| 2015/0178108 | A1* | 6/2015 | Tarasuk-Levin | G06F 9/45558 |
| | | | | 718/1 |
| 2015/0301818 | A1* | 10/2015 | Voronkov | G06F 8/65 |
| | | | | 717/168 |
| 2016/0162409 | A1* | 6/2016 | Kim | G06F 12/0862 |
| | | | | 711/137 |

OTHER PUBLICATIONS

Shi et al. "A Cloud Service Cache System Based on Memory Template of Virtual Machine", 2011 IEEE, pp. 168-173.*

* cited by examiner

| | Description of VM State | | | Description of Changes |
|---|---|---|---|---|
| 300(1) | | | | |
| 302(1) → | OSa V1.0 | | | OSa V1.0 (base1) |
| 304(1) → | OSa V1.0 | APPa | | base1 -> base1 + APPa |
| 304(2) → | OSa V1.0 | APPa | APPb | base1 + APPa -> base1 + APPa + APPb |
| 300(2) | | | | |
| 302(2) → | OSa V1.1 | | | OSa V1.0 (base2) |
| 304(3) → | OSa V1.1 | APPa | | base2 -> OSa V1.1 + APPa |
| 304(4) → | OSa V1.1 | APPa | APPb | base2 -> OSa V1.1 + APPa + Appb |
| 300(3) | | | | |
| 302(3) → | OSa V1.2 | | | OSa V1.0 (base3) |
| 304(5) → | OSa V1.2 | APPa | | base3 -> OSa V1.2 + APPa |
| 304(6) → | OSa V1.2 | APPa | APPb | base3 -> OSa V1.2 + APPa + Appb |

FIG. 3

EFFECTIVE AND EFFICIENT VIRTUAL MACHINE TEMPLATE MANAGEMENT FOR CLOUD ENVIRONMENTS

RELATED APPLICATIONS

Benefit is claimed under 35 U.S.C. 119(a)-(d) to Foreign application Serial No. 201641004376 filed in India entitled "EFFECTIVE AND EFFICIENT VIRTUAL MACHINE TEMPLATE MANAGEMENT FOR CLOUD ENVIRONMENTS", filed on Feb. 8, 2016, by VMware, Inc., which is herein incorporated in its entirety by reference for all purposes.

BACKGROUND

Virtual machines are "virtualized" versions of computer systems. Supervisory software such as a hypervisor abstracts computer hardware from software executing in a virtual machine. Virtual machines provide benefits such as security, scalability, robustness and other benefits. Virtual machine templates may be used to quickly spawn virtual machines without needing to install software and configure various options of the virtual machine. However, virtual machines templates are typically quite large and thus consume a large amount of disk space for storage of the templates as well as bandwidth resources when transferred over a network.

SUMMARY

One embodiment includes a method for spawning a container based on a template library. The method includes identifying a base image for spawning the container. The method also includes identifying one or more differential templates from within the template library for generating the container. The method further includes receiving, at a computing system, the one or more differential templates from the template library, wherein the template library is stored at a remote computer system that is remote from the computing system. The method also includes combining the one or more differential templates with the base image, to generate the container.

Other embodiments include a system and a non-transitory computer-readable medium storing instructions that, when executed by a processor, cause the processor to perform a method.

BRIEF DESCRIPTION OF THE DRAWINGS

FIG. 3 illustrates template hierarchies, according to an example.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
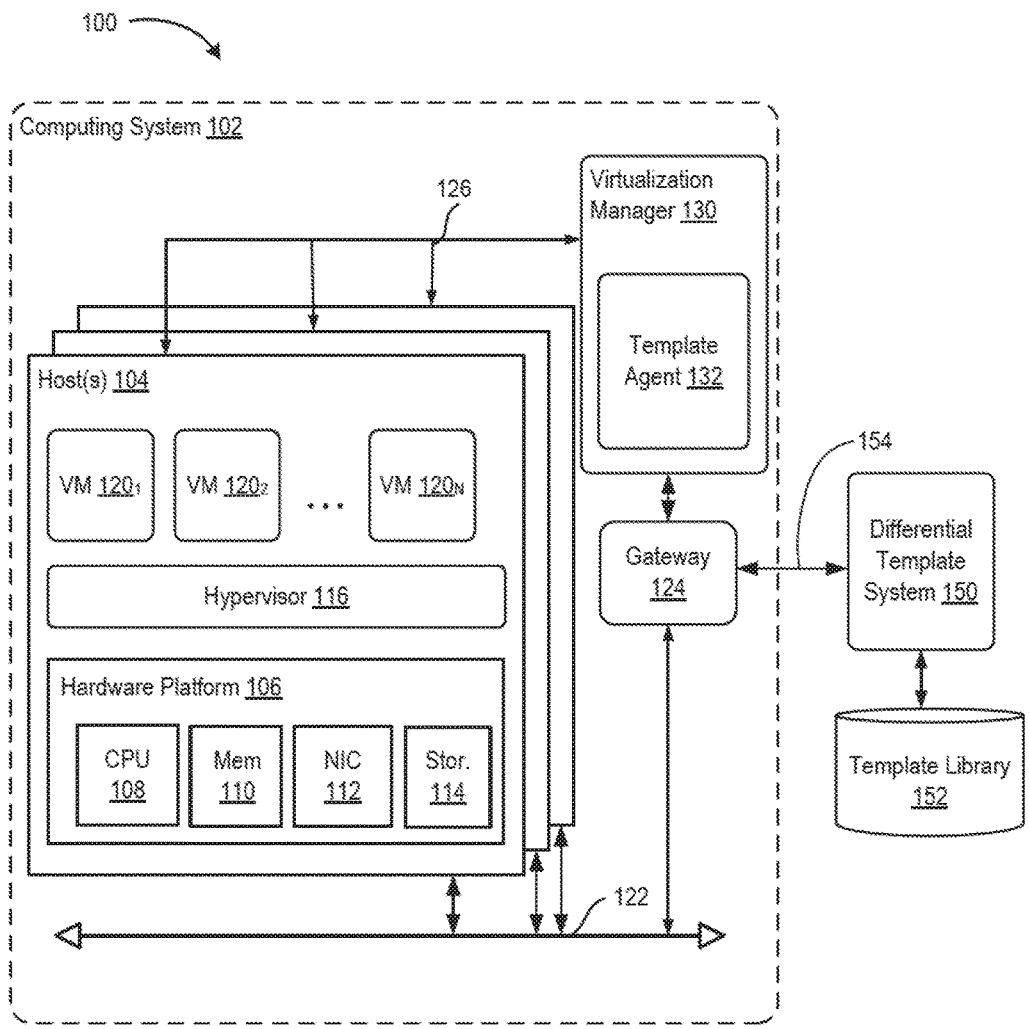
FIG. 1 is a block diagram of a template system in which one or more embodiments of the present disclosure may be utilized.

FIG. 1 is a block diagram of a template system 100 in which one or more embodiments of the present disclosure may be utilized. Template system 100 includes a computing system 102, a differential template system 150 coupled to computing system 102, and a template library 152 that stores templates for use by computing system 102.

Computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as, for example, executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within, computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtualized execution contexts. The term "virtualized execution contexts" refers to environments in which software, such as applications, may execute and be isolated from other software. Examples of virtualized execution contexts include virtual machines, containers (such as Docker containers), and other contexts. In some embodiments, the virtualized execution contexts are virtual machines, such as virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Computing system 102 includes a virtualization management module (depicted in FIG. 1 as virtualization manager 130) that may communicate with the plurality of hosts 104 via a network, sometimes referred to as a management network 126. In one embodiment, virtualization manager 130 is a computer program that resides and executes in a central server, which may reside in computing system 102, or alternatively, may run in a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

Gateway 124 (e.g., executing as a virtual appliance) is configured to provide VMs 120 and other components in computing system 102 with connectivity to an external network (e.g., Internet) via connection 154. Gateway 124 may manage external public IP addresses for VMs 120, route traffic incoming to and outgoing from computing system 102 and provide networking services, such as firewalls, network address translation (NAT), dynamic host configuration protocol (DHCP), load balancing, and virtual private network (VPN) connectivity over the network.

Virtualization manager 130 includes template agent 132 that manages VMs 120 through the use of templates. Template agent 132 may be executed on a computer system and thereby perform the operations described herein. The computer system that executes template agent 132 may be one of hosts 104 (that execute or is configured to execute VMs 120) or may by a computer system other than one of hosts 104, that includes elements for executing software, such as a processor, memory, and the like. Differential template system 150 manages template library 152, which stores template data for use by template agent 132 to spawn new VMs in computer system 102. Differential template system 150 may be embodied as a computer system including, for example, one or more microprocessors, memory, non-volatile storage, input/output devices, and the like, executing software that performs the operations described herein. Differential template system 150 may be remote from computing system 102 in the sense that differential template system 150 communicates with computing system 102 via a network connection 154, which may be a portion of a long distance network, such as a global computer network like the Internet, a wide area network ("WAN") or another network. Differential template system 150 may be remote from computing system 102 in the sense that computing system 102 is in a different physical location than differential template system 150 (e.g., in a different building, or a different city, state, or country). Template library 152 may be stored in a non-volatile storage system (e.g., a hard drive or other data storage device) coupled to differential template system 150.

A template comprises data describing a particular VM configuration. Templates may include metadata that describes a VM, as well as data stored on disk for the VM, such as an operating system, one or more applications, data, and other information that would be stored one or more virtual disks (e.g., a virtual machine disk or "VMDK" file) for a virtual machine. Templates are stored in template library 152 in a manner that reduces time and bandwidth requirements for transmission across connection 154. More specifically, instead of storing each template as including all data that would be required to spawn a particular virtual machine, differential template system 150 maintains certain templates as "differential templates," which represent changes with respect to other templates. This technique of storage produces bandwidth savings because the amount of data that is to be transferred to spawn a VM based on a template, on average, is reduced. Further details are provided below.

The various components of hardware platform 106 may differ across different host computer systems 104. For example, the processor in one host computer system 104 may belong to the Intel family of processors while the processor in a different host computer system 104 may belong to the AMD family of processors. Processors 108 may also differ in other ways, such as processor speed, architecture bit size, and in other ways.

Figure 2:
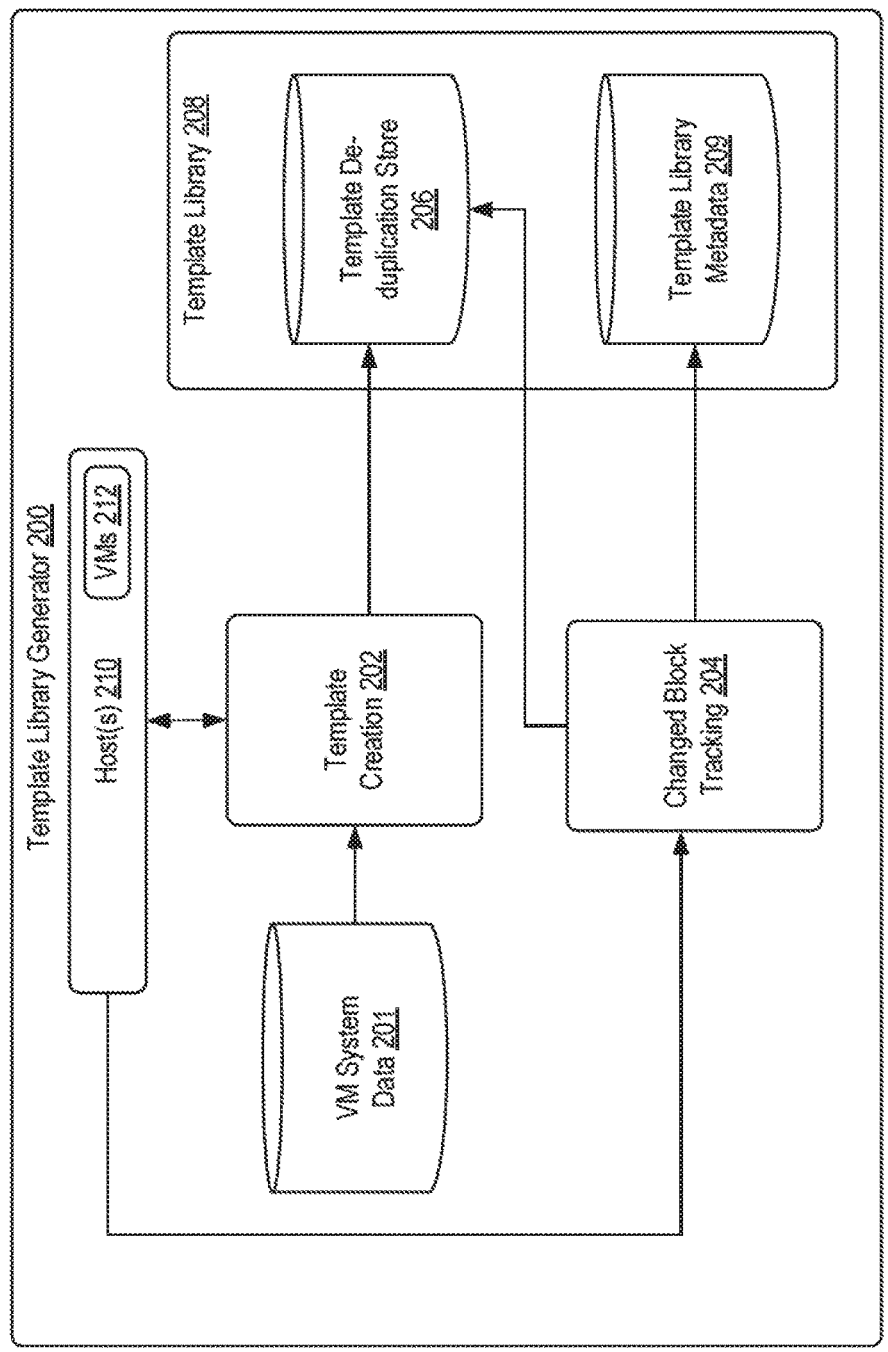
FIG. 2 is a block diagram of a template library generator according to an example.

FIG. 2 is a block diagram of a template library generator 200, according to an example. As shown, template library generator 200 includes a template creation module 202 and a change block tracker 204, as well as VM system data 201 and template library 208, which includes a template de-duplication store 206, and template library metadata 209. Template library generator 200 also includes one or more hosts 210 that execute one or more VMs 212.

Template library generator 200 may be a part of differential template system 150 of FIG. 1 or may be external to differential template system 150. In some embodiments, template library 208 is the same as template library 152 of FIG. 1. In other embodiments, upon updating or generating template library 208 (or at some point after updating or generating template library 208), template library generator 200 or another system may copy the data in template library 208 to template library 152 for use by differential template system 150. Template library generator 200 may be embodied as a computer system that includes components, such as a processor, memory, non-volatile storage, input/output devices, and the like, for performing the operations described herein. VM system data 201, template de-duplication store 206 and template library 208 may include volatile or non-volatile storage elements, such as hard drives, that store data as specified herein. One example of a system that performs functions of template de-duplication store 206 is the Avamar de-duplication backup software and system available from EMC Corporation of Hopkinton, Mass.

Hosts 210 comprise computer systems that may be similar to hosts 104 and that are configured to support and execute virtual, machines 212. Thus, hosts 210 may include one or more computing devices having processors, memory, non-volatile storage, and other hardware, and that execute hypervisors for supporting execution of VMs 212.

Template creation module 202 and change block tracker 204 cooperate to generate template hierarchies for storage in template library 208. Generally, template creation module 202 uses data stored in VM system data 201 to generate templates for storage into template de-duplication store 206. De-duplication store 206 is a storage that only stores one copy of duplicate disk blocks (thus "de-duplicating" data written to de-duplication store 206). Changed block tracking module 204 notes which blocks are changed when different templates are written to template de-duplication store 206 and writes indications of such blocks to template library metadata 209 in order to record what changes are made between templates. Information regarding which blocks change may be obtained by change block tracking module 204 from hosts 210 or from virtualization manager 130. One example of a product that performs the functions of changed block tracking module 204 is the "changed block tracking" feature available on the ESX® ESXi™ hypervisor available from VMware, Inc, of Palo Alto, Calif. Additional details regarding the above-described operations follow.

To create a template hierarchy, template creation module 202 first creates a base template. The base template represents a "substrate" or basic template upon which the template hierarchy is built. To create the base template, template creation module 202 obtains data for creation of the base template from VM system data 201 and creates a template that corresponds to the base template. To create such a template, template creation module 202 determines what operation system and applications (if any) are to be included in the base template. Template creation module 202 spawns a new VM 212 within host(s) 210. Template creation module 202 then installs the desired operating system and/or applications (if any) in the new VM 212. Template creation module 202 converts the virtual machine that includes the desired operating system and installed applications into a template and stores the template in template de-duplication store 206 for use as the base template. Changed block tracking 204 may record the blocks associated with that base template as block data that describes the base template. A commercially available product that allows for creation of templates from VMs is the vSphere virtualization management tool, available from VMware, Inc., of Palo Alto, Calif.

Template creation module 202, may create various types of templates for use as base templates in template hierarchies. In one example, a base template may include only an operating system. In another example, a base template may include an operating system, a first application, and a second application.

Note that base templates are stored as all data that comprises a VM. By contrast, template hierarchies also include templates that are stored and described as changes with respect to other templates. Templates stored in this manner are referred to as differential templates. To create a differential template, template creation module 202 modifies a VM that corresponds to a base template or a differential template. Examples of such a modification include updating the operating system installed in the VM to a new version, installing one or more applications in the VM, or making other changes. After modifying the VM, template creation module 202 creates another template from the now modified VM and writes this template to template de-duplication store 206. Changed block tracking mechanism 204 tracks which blocks are changed when the new template is written and writes indications of the changed blocks to template library 208 to indicate what blocks are associated with this differential template. The differential template represents the differences between the base template (or other differential template) and the new template.

Template creation module 202 may create any number of differential templates in a hierarchy by modifying a VM corresponding to any template stored in template library 208, storing the modified VM to the de-duplication store 206, and recording what changes are made. The order in which modifications are made defines the structure of the hierarchy. Template creation module 202 may create multiple hierarchies in this manner.

Because templates are stored differentially, templates may be transferred to computing system 102 for use in spawning a new VM 120 utilizing a reduced amount of bandwidth as compared with non-differential template systems. More specifically, instead of requiring that all data for a particular VM be transmitted when computing system 102 spawns a new VM, generation and storage of differential templates reduces the amount of data that is to be transmitted by requiring only differential templates to be transmitted when a new VM is to be spawned.

FIG. 3 depicts template hierarchies 300, according to an example. Base templates 302 are shown at the top of the template hierarchies 300, with differential templates 304 being based on base template 302. While base templates 302 may represent any of a wide variety of types of VMs, several example base templates 302 are shown in the example of FIG. 3. Specifically, base template 302(1) includes a first version of an operating system, shown as "OSa V1.0," or "operating system a, version 1.0," base template 302(2) includes a second version of an operating system, "OSa V1.1," and base template 302(3) includes a third version of the operating system, "OSa V1.2." Further, while differential templates 304 are shown as including an additional application as compared with the base templates 302 or other differential templates 304, differential templates 304 can be generated by changing base templates 302 or differential templates 304 in ways other than by installing a new application. The logical structure of operating system and installed apps is just one example of possible structures of a template hierarchy. Note that two columns are shown in FIG. 3. The first column indicates the contents of a corresponding VM and the second column indicates the changes made with respect to a prior template, for differential templates 304.

Note that metadata that describes the logical relationships between base template 302 and differential templates 304 and that defines the template hierarchy 300 are stored in template library metadata 209. Template hierarchies 300 are organized to provide a "menu" of templates from which computer system 102 may spawn new VMs 120. Although template hierarchy 300 may be organized in any manner, template hierarchy 300 is beneficially organized for selection of different software configurations that differ in terms of applications that are installed and version of software that is installed.

Figure 4:
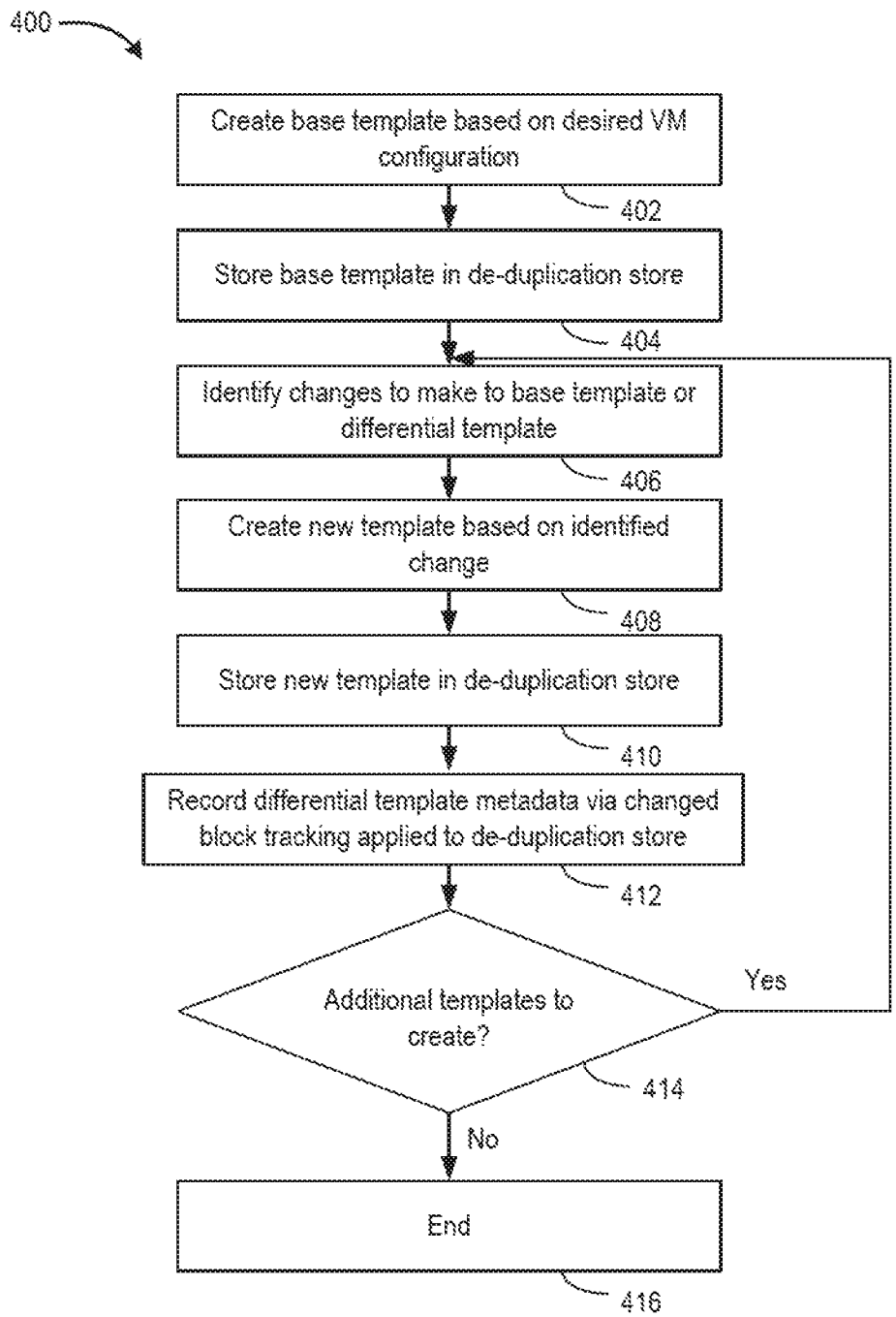
FIG. 4 is a flow diagram of a method for generating a template hierarchy, according to an example.

FIG. 4 is a flow diagram of a method 400 for generating a template hierarchy, according to an example. Although method 400 is described with respect to the system of FIGS. 1-2, those of in the art will recognize that any system that performs the steps of method 400, in various alternative technically feasible orders, falls within the scope of the present disclosure.

As shown, method 400 begins at step 402, where template creation module 202 creates a base template based on a desired VM configuration. A base template is a template from which differential templates are created based on changes to the base template. Base templates may include what is considered to be a "basic" configuration, such as a template that includes a specific version of an operating system deemed to be the "base" version, but does not include any applications. Other base templates may be templates that include an operating system as well as applications installed over that operating system. The base template is not stored "differentially," and is a complete template for a corresponding VM.

At step 404, template creation module 202 stores the base template in template de-duplication store 206. As described above, template de-duplication store 206 "de-duplicates" data by storing only disk blocks that are different from data blocks already stored in template de-duplication store 206. Template de-duplication store 206 is capable of differentiating between different hierarchies so that data conflicts between hierarchies do not occur.

After writing the base template to de-duplication store 206, at step 406, template creation module 202 identifies a change to make to the base template (or differential template). Such changes may include, for example, installing an application, upgrading the operating system, or otherwise modifying the data that defines the template. At step 408, template creation module 202 creates a new template by making the changes identified at step 406 to a VM corresponding to the base template (or to a differential template) and by generating a template from the now modified VM. At step 410, template creation module 202 stores the newly created template into template de-duplication store 206. At step 412, changed block tracking module 204 records the collection of changed blocks that result from storing this new template, in order to define a differential template 304 that corresponds to the changes identified at step 406. Template creation module 202 also stores, in template library metadata 209, a logical link between the template to which the changes were applied and the template newly created at step 412, in order to define a part of the template hierarchy.

At step 414, template creation module 202 determines whether there are additional changes to make in order to create new differential templates. If there are additional changes to make, then method 400 returns to step 406, where new changes are identified for application to a base template or to a differential template in order to generate a new differential template. If no additional changes exist, then method 400 proceeds to step 416, where the method ends. Note that the changes made at step 406 may be made either to a base template or to a template that is modified with respect to the base template.

The result of method 400 is a template hierarchy 300 in template library 208, which stores a base template 302, one or more differential templates 304, and the logical structure that connects base templates 302 and differential templates 304.

Figure 5:
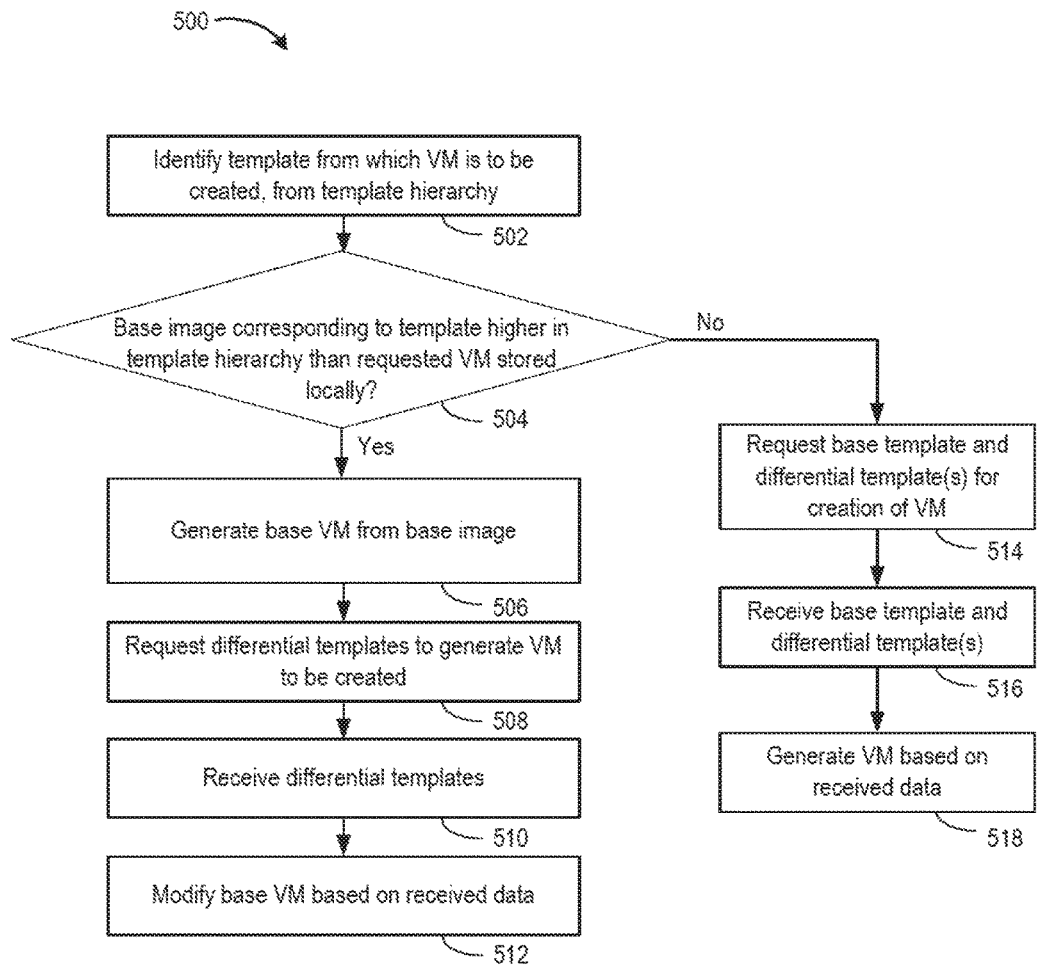
FIG. 5 is a flow diagram of a method for spawning a VM using a template hierarchy, according to an example.

FIG. 5 is a flow diagram of a method 500 for spawning a VM using a template hierarchy, according to an example. Although method 500 is described with respect to the system of FIGS. 1-2, those of skill in the art will recognize that any system that performs the steps of method 500, in various alternative technically feasible orders, falls within the scope of the present disclosure.

As shown, method 500 begins at step 502, where template agent 132 identifies a template from which a new VM is to be created in computing system 102, from a template hierarchy in template library 152. Template agent 132 may, for example, request a list of template hierarchies that are stored. Template library 152 may return such a list to template agent 132, which then selects a particular template from that list.

At step 504, template agent 132 determines whether a base image that corresponds to a template that is higher in a template hierarchy 300 than the requested VM is stored at the computer system in which the new VM is to be created. A base image is a template that is generated based on template data previously received from template library 152. A computer system may store a base image for "reference" if the computer system previously requested template data from template library 152 in order to generate a VM. A computer system may also happen to not store a base image if the computer system did not previously request such a template. Note that it is possible for a computer system to store a base image for one particular template hierarchy but not for another template hierarchy. Thus, at step 504, template agent 132 determines whether the VM stores a base image that corresponds to a template that is higher than the requested VM in a template hierarchy that includes the template from which the new VM is to be created. If such a base image exists, then method 500 proceeds to step 506 and if such a base image does not exist, then method 500 proceeds to step 514.

At step 506, template agent 132 generates a VM from the base image. Because the base image is a locally stored template, no data transfer from template library 152 is necessary. At step 508, template agent 132 requests differential templates from template library 152 that correspond to the changes between the base image and the template from which a new VM is to be created. Template library 152 follows the logical structure of the hierarchy in which that template exists, identifies each of the differential templates necessary for reconstructing the requested VM, and transmits those differential templates, which template agent 132 receives at step 510. At step 512, template agent 132 modifies the VM based on the received differential templates and as dictated by the logical structure of the hierarchy. More specifically, template agent 132 modifies the VM constructed from the base image in the order in which the differential templates appear in the template hierarchy.

Referring back to step 514, which occurs if a base image corresponding to a template that is higher in a template hierarchy than the identified template for creation of the VM is not stored locally, template agent 132 requests a base template and differential templates for creation of the VM. The base template and differential templates must be requested here, since the computer system 102 does not store any data for the VM for which creation is requested. Thus, differential templates alone are not sufficient.

At step 516, template agent 132 receives the requested base template and differential templates from template library 152, and a step 518, template agent 132 generates the requested VM by generating a VM based on the base template and modifying the VM based on the differential templates.

Note that a base image does not need to correspond to a base template and can in fact correspond to a differential template. While a base image that corresponds to a base template would be substantially identical to the base template, a base image that corresponds to a differential template would not be substantially identical to any base template or differential template stored in template library 152. Instead, such a base image would be a "full" template generated from a VM that is the result of performing method 500. More specifically, template agent 132 would identify a particular template in a particular template hierarchy, would generate a VM from that template as described with respect to method 500, and would then create a template from that VM. This template is the base image.

Note also that, to save space, template agent 132 may delete differential templates from local storage (i.e., within computing system 102). Although computing system 102 stores a base image to reduce the amount of data received from differential template system 150, storing all of the differential templates received from such differential template system 150 may consume too much storage.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation physical quantities—usually, though not necessarily, these quantities may take the form of electrical or magnetic signals, were or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory a flash memory device), a CD (Compact Discs)—CD-ROM, a CD-R, or a CD-RW, a DVD (Digital Versatile Disc), a magnetic tape, and other and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless, explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for spawning a container based on a template library, the method comprising:
   identifying a base image for spawning the container;
   identifying a plurality of differential templates from within the template library for generating the container, wherein a differential template of the differential templates is generated by recording which disk blocks change when writing a template corresponding to the differential template to a de-duplication store;
   receiving, at a computing system, the differential templates from the template library, wherein the template library is stored at a remote computer system that is remote from the computing system; and
   combining the differential templates with the base image, to generate the container, wherein combining the differential templates comprises modifying particular disk blocks as specified by the differential templates within the template library.

2. The method of claim 1, wherein the base image corresponds to one of a base template and a differential template of the template hierarchy included within the template library.

3. The method of claim 1, wherein the container is defined by one or more of an operating system and an application.

4. The method of claim 1, further comprising:
   determining that the base image is stored at the computing system, and
   responsive to the determining, foregoing requesting a base template from the remote computer system.

5. The method of claim 1, further comprising:
   after combining the differential templates and the base image, deleting the differential templates from the computing system.

6. The method of claim 1, wherein:
   a differential template of the differential templates differs from the base image by one or more of an installed application or an operating system version.

7. The method of claim 1, wherein combining the differential templates comprises modifying the particular disk blocks in an order specified by a template hierarchy included within the template library.

8. A computing system for spawning a container based on a template library, the system comprising:
- a host configured to execute the container; and
- a template agent coupled to the host and configured to:
  - identify a base image for spawning the container,
  - identify a plurality of differential templates from within the template library for generating the container, wherein a differential template of the differential templates is generated by recording which disk blocks change when writing a template corresponding to the differential template to a de-duplication store,
  - receive the differential templates from the template library, wherein the template library is stored at a remote computer system that is remote from and coupled to the computing system, and
  - combine the differential templates with the base image, to generate the container, wherein combining the differential templates comprises modifying particular disk blocks as specified by the differential templates within the template library.

9. The computing system of claim 8, wherein the base image corresponds to one of a base template and a differential template of the template hierarchy included within the template library.

10. The computing system of claim 8, wherein the container is defined by one or more of an operating system and an application.

11. The computing system of claim 8, wherein the template agent is further configured to:
- determine that the base image is stored at the computing system, and
- responsive to the determining, forego requesting a base template from the remote computer system.

12. The computing system of claim 8, wherein the template agent is further configured to:
- after combining the differential templates and the base image, delete the differential templates from the computing system.

13. The computing system of claim 8, wherein:
- a differential template of the differential templates differs from the base image by one or more of an installed application or an operating system version.

14. The computing system of claim 8, wherein the template agent is further configured to combine the one or more differential templates by modifying the particular disk blocks in an order specified by a template hierarchy included within the template library.

15. A non-transitory computer-readable medium storing instructions that, when executed by a processor, cause the processor to perform a method for spawning a container based on a template library, the method comprising:
- identifying a base image for spawning the container;
- identifying a plurality of differential templates from within the template library for generating the container, wherein a differential template of the differential templates is generated by recording which disk blocks change when writing a template corresponding to the differential template to a de-duplication store;
- receiving, at a computing system, the differential templates from the template library, wherein the template library is stored at a remote computer system that is remote from the computing system; and
- combining the differential templates with the base image, to generate the container, wherein combining the differential templates comprises modifying particular disk blocks as specified by the differential templates within the template library.

16. The non-transitory computer-readable medium of claim 15, wherein the method further comprises:
- determining that the base image is stored at the computing system, and
- responsive to the determining, foregoing requesting a base template from the remote computer system.

17. The non-transitory computer-readable medium of claim 15, wherein combining the differential templates comprises modifying the particular disk blocks in an order specified by a template hierarchy included within the template library.

* * * * *